US011687257B2

(12) United States Patent
Fan et al.

(10) Patent No.: US 11,687,257 B2
(45) Date of Patent: Jun. 27, 2023

(54) STORAGE CLUSTER LOAD BALANCING BASED ON PREDICTED PERFORMANCE METRICS

(71) Applicant: Dell Products L.P., Round Rock, TX (US)

(72) Inventors: Huijuan Fan, Chengdu (CN); Chi Chen, Chengdu (CN); Hailan Dong, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 84 days.

(21) Appl. No.: 17/545,444

(22) Filed: Dec. 8, 2021

(65) Prior Publication Data

US 2023/0161488 A1 May 25, 2023

(30) Foreign Application Priority Data

Nov. 25, 2021 (CN) .......................... 202111417133.5

(51) Int. Cl.
*G06F 12/00* (2006.01)
*G06F 3/06* (2006.01)

(52) U.S. Cl.
CPC .......... *G06F 3/0631* (2013.01); *G06F 3/0604* (2013.01); *G06F 3/067* (2013.01); *G06F 3/0611* (2013.01); *G06F 3/0647* (2013.01); *G06F 3/0679* (2013.01)

(58) Field of Classification Search
CPC .... G06F 3/0631; G06F 3/0604; G06F 3/0647; G06F 2212/1016
See application file for complete search history.

(56) References Cited

U.S. PATENT DOCUMENTS

| 9,846,734 B2 * | 12/2017 | Dhavale | G06F 7/00 |
| 10,489,074 B1 * | 11/2019 | Gritter | G06F 3/0611 |
| 11,561,714 B1 * | 1/2023 | Mertes | G06F 3/0653 |
| 11,630,585 B1 * | 4/2023 | Colgrove | G06F 3/0665 |
| | | | 711/114 |

(Continued)

OTHER PUBLICATIONS

NVM Express, "NVM Express, Revision 1.3," NVM Express, May 1, 2017, 282 pages.

(Continued)

*Primary Examiner* — John A Lane
(74) *Attorney, Agent, or Firm* — Ryan, Mason & Lewis, LLP

(57) ABSTRACT

An apparatus comprises a processing device configured to initiate load balancing for a storage cluster comprising two or more storage nodes, to predict performance metrics for the storage nodes at two or more time points in a designated future period of time, and to select, based at least in part on the predicted performance metrics, a first one of the storage nodes as a source storage node and a second one of the storage nodes as a target storage node. The processing device is further configured to determine at least one storage object residing on the source storage node which, when migrated to the target storage node, reduces a performance imbalance rate of the storage cluster for at least the designated future period of time, and to perform load balancing for the storage cluster by migrating the at least one storage object from the source to the target storage node.

20 Claims, 11 Drawing Sheets

(56) References Cited

U.S. PATENT DOCUMENTS

| | | | |
|---|---|---|---|
| 2012/0278512 A1* | 11/2012 | Alatorre | G06F 3/0605 |
| | | | 710/33 |
| 2018/0248771 A1* | 8/2018 | Côté | H04L 41/0893 |
| 2021/0263667 A1* | 8/2021 | Whitlock | G06F 3/0614 |
| 2022/0027182 A1* | 1/2022 | Igelka | G06F 3/167 |
| 2022/0206871 A1* | 6/2022 | Armangau | G06F 9/5016 |
| 2022/0229560 A1* | 7/2022 | Dar | G06F 3/0653 |
| 2022/0244877 A1* | 8/2022 | Chen | G06F 3/067 |
| 2022/0357998 A1* | 11/2022 | Chen | G06F 3/067 |

OTHER PUBLICATIONS

G.-W. You et al. "Scalable Load Balancing in Cluster Storage Systems," Middleware Lecture Notes in Computer Science, vol. 7049, 2011, pp. 101-122.

G. Liu et al., "Computing Load Aware and Long-View Load Balancing for Cluster Storage Systems," 2015 IEEE International Conference on Big Data, Oct. 29-Nov. 1, 2015, pp. 174-183.

G. Ciardo et al., "EquiLoad: A Load Balancing Policy for Clustered Web Servers," Performance Evaluation, vol. 46, No. 2-3, Oct. 2001, 25 pages.

D. Kunkle et al., "A Load Balancing Framework for Clustered Storage Systems," International Conference on High-Performance Computing, 2008, pp. 57-72.

S. Winograd, "On Computing the Discrete Fourier Transform," Mathematics of Computation, vol. 32, No. 141, Jan. 1978, pp. 175-199.

\* cited by examiner

STORAGE CLUSTER LOAD BALANCING BASED ON PREDICTED PERFORMANCE METRICS

RELATED APPLICATION

The present application claims priority to Chinese Patent Application No. 202111417133.5, filed on Nov. 25, 2021 and entitled "Storage Cluster Load Balancing Based on Predicted Performance Metrics," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for TO operations. In some information processing systems, multiple storage systems may be used to form a storage cluster.

SUMMARY

Illustrative embodiments of the present disclosure provide techniques for storage cluster load balancing based on predicted performance metrics.

In one embodiment, an apparatus comprises at least one processing device comprising a processor coupled to a memory. The at least one processing device is configured to perform the steps of initiating load balancing for a storage cluster comprising two or more storage nodes, predicting performance metrics for the two or more storage nodes of the storage cluster at two or more time points in a designated future period of time, and selecting, based at least in part on the predicted performance metrics for the two or more storage nodes of the storage cluster at the two or more time points in the designated future period of time, a first one of the two or more storage nodes of the storage cluster as a source storage node and a second one of the two or more storage nodes of the storage cluster as a target storage node. The at least one processing device is further configured to perform the steps of determining at least one storage object residing on the source storage node which, when migrated to the target storage node, reduces a performance imbalance rate of the storage cluster for at least the designated future period of time, and performing load balancing for the storage cluster by migrating the at least one storage object from the source storage node to the target storage node.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
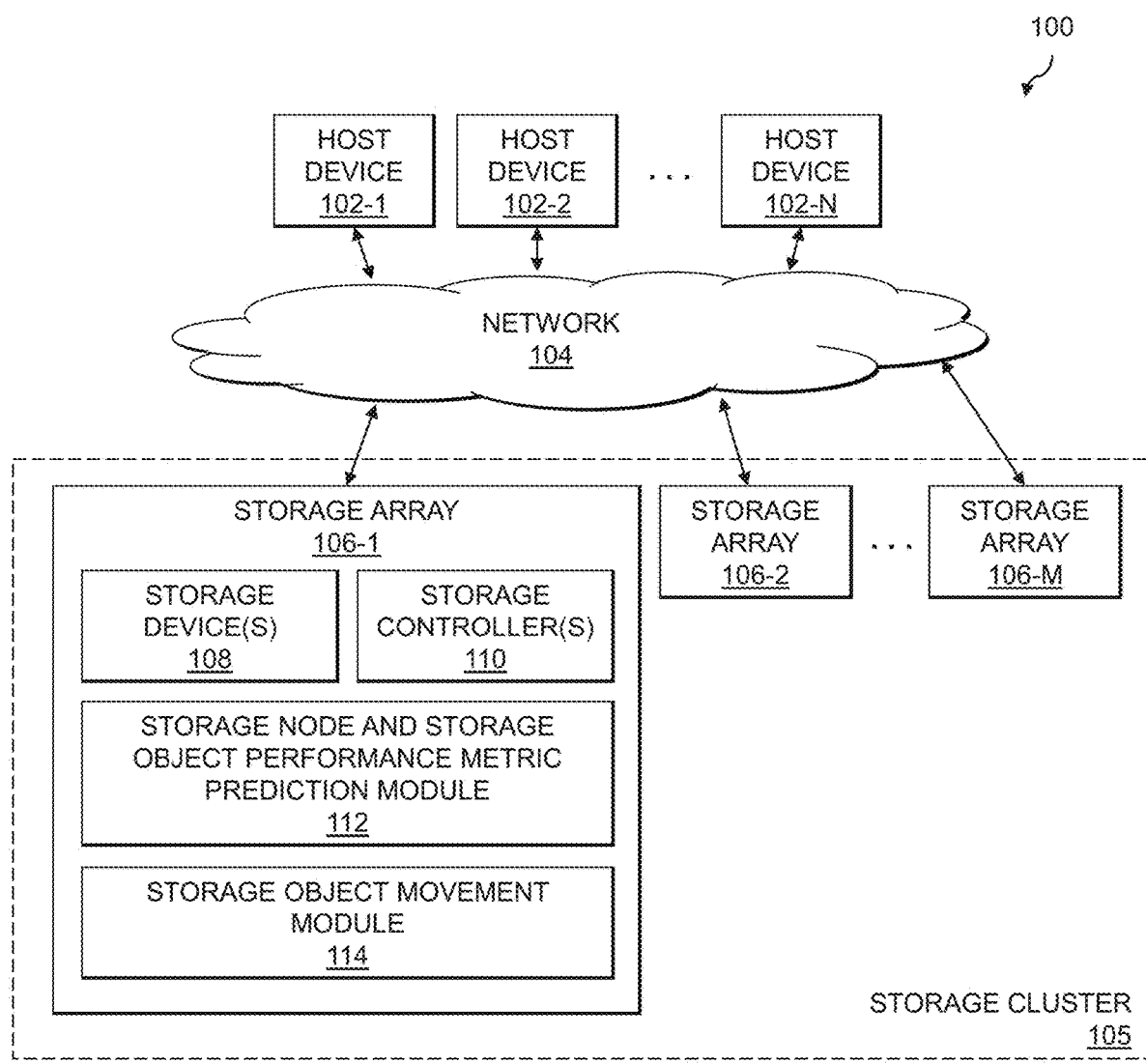
FIG. 1 is a block diagram of an information processing system configured for storage cluster load balancing based on predicted performance metrics in an illustrative embodiment.

FIG. 1 shows an information processing system 100 configured in accordance with an illustrative embodiment to provide functionality for storage cluster load balancing based on predicted performance metrics. The information processing system 100 comprises one or more host devices 102-1, 102-2, ... 102-N (collectively, host devices 102) that communicate over a network 104 with one or more storage arrays 106-1, 106-2, ... 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate 10 processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

In the information processing system 100 of FIG. 1, the storage arrays 106 are assumed to be part of a storage cluster 105 (e.g., where the storage arrays 106 may be used to implement one or more storage nodes in a cluster storage system comprising a plurality of storage nodes interconnected by one or more networks), and the host devices 102 are assumed to submit IO operations to be processed by the storage cluster 105. At least one of the storage controllers of the storage arrays 106 (e.g., the storage controller 110 of storage array 106-1) is assumed to implement functionality for intelligent data movement across the storage devices 108 of the storage array 106-1 (e.g., between different ones of the storage devices 108 or portions thereof that provide different storage tiers in the storage cluster 105), and between the storage array 106-1 and one or more other ones of the storage arrays 106-2 through 106-M. Such intelligent data movement functionality is provided via a storage node and storage object performance metric prediction module 112 (also referred to as a performance metric prediction module 112) and a storage object movement module 114.

The intelligent data movement functionality is utilized as part of storage cluster-wide load balancing operations for the storage cluster 105. Load balancing for the storage cluster 105 may be initiated in response to various conditions, such as a user request, determining that at least a threshold amount of time has passed since load balancing was last performed, determining that a current performance imbalance rate of the storage cluster exceeds an acceptable imbalance rate threshold, etc. Once load balancing is initiated, the performance metric prediction module 112 predicts performance metrics for the two or more storage nodes (e.g., storage arrays 106) of the storage cluster 105 at two or more time points in a designated future period of time. The performance metric prediction module 112 then selects, based at least in part on the predicted performance metrics for the two or more storage nodes of the storage cluster at the two or more time points in the designated future period of time, a first one of the two or more storage nodes of the storage cluster as a source storage node and a second one of the two or more storage nodes of the storage cluster as a target storage node.

The performance metric prediction module 112 is further configured to determine at least one storage object residing on the source storage node which, when migrated to the target storage node, reduces a performance imbalance rate of the storage cluster for at least the designated future period of time. This determination may be based at least in part on predicting performance metrics for two or more storage objects residing on the source storage node at the two or more time points in the designated future period of time. The storage object movement module 114 is configured to perform load balancing for the storage cluster 105 by migrating the at least one storage object from the source storage node to the target storage node.

As noted above, in some embodiments the storage arrays 106 in the FIG. 1 embodiment are assumed to be part of the storage cluster 105. The storage cluster 105 is assumed to provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

Although in the FIG. 1 embodiment the performance metric prediction module 112 and the storage object movement module 114 are shown as being implemented internal to the storage array 106-1 and outside the storage controllers 110, in other embodiments one or both of the performance metric prediction module 112 and the storage object movement module 114 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of the performance metric prediction module 112 and the storage object movement module 114.

At least portions of the functionality of the performance metric prediction module 112 and the storage object movement module 114 may be implemented at least in part in the form of software that is stored in memory and executed by a processor.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 10 and 11.

It is to be understood that the particular set of elements shown in FIG. 1 for storage cluster load balancing based on predicted performance metrics is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for storage cluster load balancing based on predicted performance metrics will now be described in more detail with reference to the flow diagram of FIG. 2. It is to be understood that this particular process is only an example, and that additional or alternative processes for storage cluster load balancing based on predicted performance metrics may be used in other embodiments.

In this embodiment, the process includes steps 200 through 208. These steps are assumed to be performed by the performance metric prediction module 112 and the storage object movement module 114. The process begins with step 200, initiating load balancing for a storage cluster comprising two or more storage nodes.

In step 202, performance metrics for the two or more storage nodes of the storage cluster at two or more time points in a designated future period of time are predicted. Step 202 may include, for a given one of the two or more storage nodes of the storage cluster, determining an access frequency trend pattern for the given storage node and utilizing the access frequency trend pattern to calculate a predicted performance metric for the given storage node at each of the two or more time points in the designated future period of time. Determining the access frequency trend pattern for the given storage node may comprise generating a trend function for predicting a total amount of data accesses for the given storage node at the two or more time points in the designated future period of time. The access frequency trend pattern for the given storage node may comprise one of an increasing access frequency trend pattern and a decreasing access frequency trend pattern, and the prediction function may be generated utilizing a least squares algorithm. The access frequency trend pattern may comprise a cyclic access frequency trend pattern, and the prediction function may be generated utilizing at least one of an autocorrelation algorithm and a discrete Fourier transform algorithm. The access frequency trend pattern may comprise an irregular access frequency pattern, and the prediction function may be generated utilizing an average of historical data accesses for the given storage node over a previous period of time.

Figure 2:
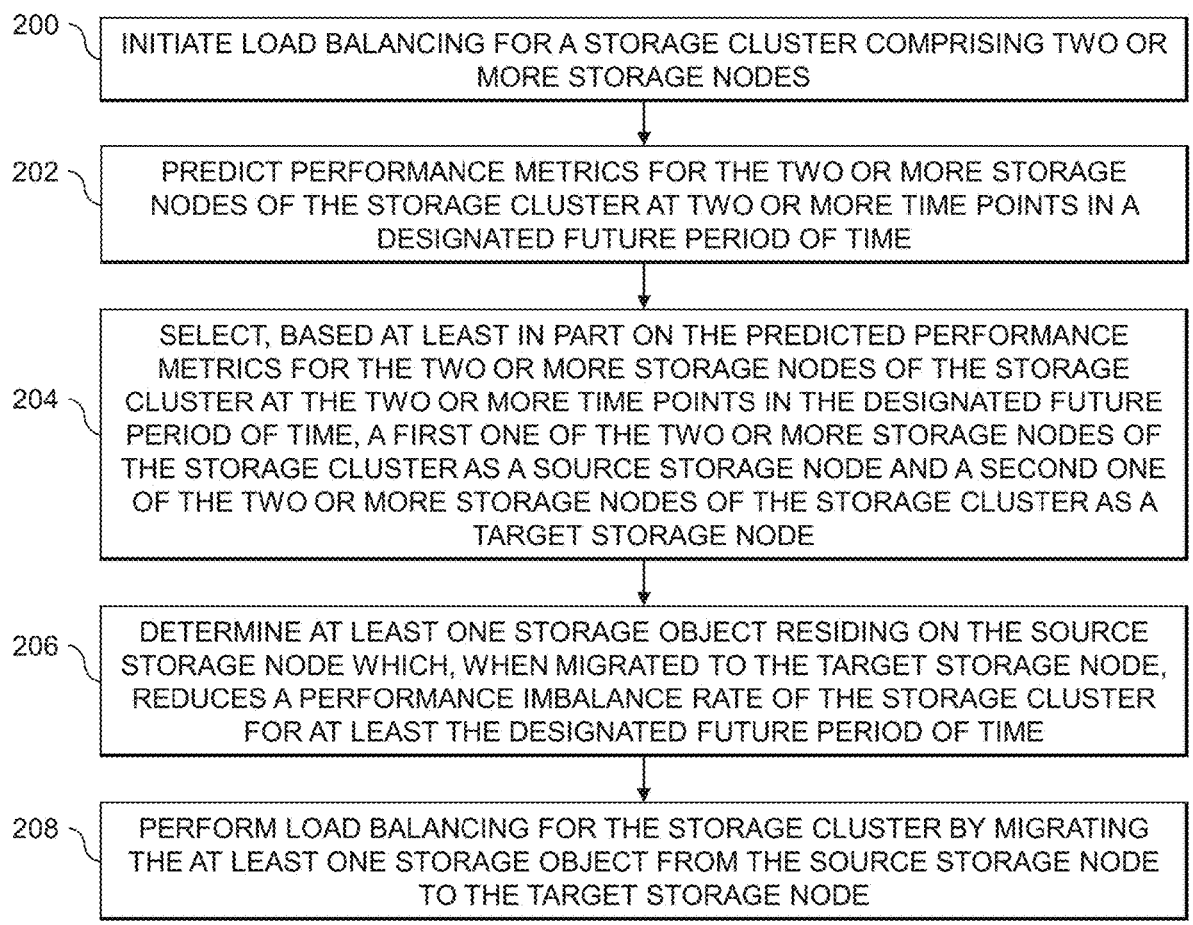
FIG. 2 is a flow diagram of an exemplary process for storage cluster load balancing based on predicted performance metrics in an illustrative embodiment.

The FIG. 2 process continues with step 204, selecting, based at least in part on the predicted performance metrics for the two or more storage nodes of the storage cluster at the two or more time points in the designated future period of time, a first one of the two or more storage nodes of the storage cluster as a source storage node and a second one of the two or more storage nodes of the storage cluster as a target storage node. The first one of the two or more storage nodes of the storage cluster selected as the source storage node has a higher sum of predicted performance metrics for the two or more time points in the designated future period of time than the second one of the two or more storage nodes of the storage cluster selected as the target storage node.

Step 206 includes determining at least one storage object residing on the source storage node which, when migrated to the target storage node, reduces a performance imbalance rate of the storage cluster for at least the designated future period of time. In some embodiments, the determination in step 206 is based at least in part on predicting performance metrics for two or more storage objects residing on the source storage node at the two or more time points in the designated future period of time. Predicting the performance metrics for the two or more storage objects residing on the source storage node at the two or more time points in the designated future period of time may comprise: determining access frequency trend patterns for the two or more storage objects residing on the source storage node; utilizing the determined access frequency trend patterns to calculate predicted performance metrics for the two or more storage objects residing on the source storage node at each of the two or more time points in the designated future period of time; and selecting a given one of the two or more storage objects residing on the source storage node as the at least one storage object based at least in part on a comparison of sums of the predicted performance metrics for the two or more time points in the designated future period of time for the two or more storage objects residing on the source storage node. Selecting the given one of the two or more storage objects residing on the source storage node as the at least one storage object may be further based at least in part on types of access frequency trend patterns associated with the two or more storage objects residing on the source storage node. Selecting the given one of the two or more storage objects residing on the source storage node as the at least one storage object may be further or alternatively based at least in part on a confidence in the predicted performance metrics for the two or more storage objects residing on the source storage node.

In step 208, load balancing for the storage cluster is performed by migrating the at least one storage object from the source storage node to the target storage node. In some embodiments, initiating load balancing for the storage cluster in step 200 is responsive to detecting that a current performance imbalance rate of the storage cluster exceeds a first designated threshold imbalance rate. Steps 202 through 208 may be repeated until the current performance imbalance rate of the storage cluster is below a second designated threshold imbalance rate. The second designated threshold imbalance rate may be less than the first designated threshold imbalance rate.

Storage object load balancing is a feature that allows for optimizing storage resource utilization in storage clusters. Storage object load balancing functionality identifies over-committed storage nodes in a storage cluster, and live migrates storage objects (e.g., LUNs, filesystems, datastores, files, etc.) from the over-committed storage nodes to under-committed storage nodes in the storage cluster. Illustrative embodiments provide a novel performance balancing mechanism for storage clusters. In some embodiments, performance trends are learned from historical data for each storage node of a storage cluster, and for each storage object stored on the storage nodes of the storage cluster. Such learned performance trends for the storage nodes and storage objects are then leveraged for performing smart storage cluster-wide performance balancing operations. The smart storage cluster-wide performance balancing operations are performed by balancing predictions of storage node and storage object performance during a future time period (e.g., 10 days). Thus, performing storage cluster-wide performance balancing at a given time will keep the whole storage cluster's performance distribution balanced for a relatively long time (e.g., the future time period over which the storage node and storage object performance predictions are made). It should be noted that, the storage cluster-wide performance balancing does not necessarily provide an immediate optimal balancing for the storage cluster (e.g., due to consideration of predicted performance over some designated future time period) but balancing is improved overall for the designated future time period over which the performance predictions are made. Illustrative embodiments are thereby able to improve performance balancing across the storage cluster by keeping storage object distribution across storage nodes of the storage cluster as balanced as possible for a longer period of time than is possible with conventional approaches. A storage cluster (e.g., storage cluster 105) is a configuration of multiple storage nodes (e.g., storage arrays 106) whose resources are aggregated together as a pool of resources contributed to the storage cluster. The resources may include processing resources (e.g., CPU or other compute resources), memory resources, network resources, and storage resources. Each storage node of the storage cluster contributes a set of such resources. In a storage cluster, it is important to balance workloads across each storage node to mitigate the risk of growing workloads negatively affecting performance.

Figure 3:
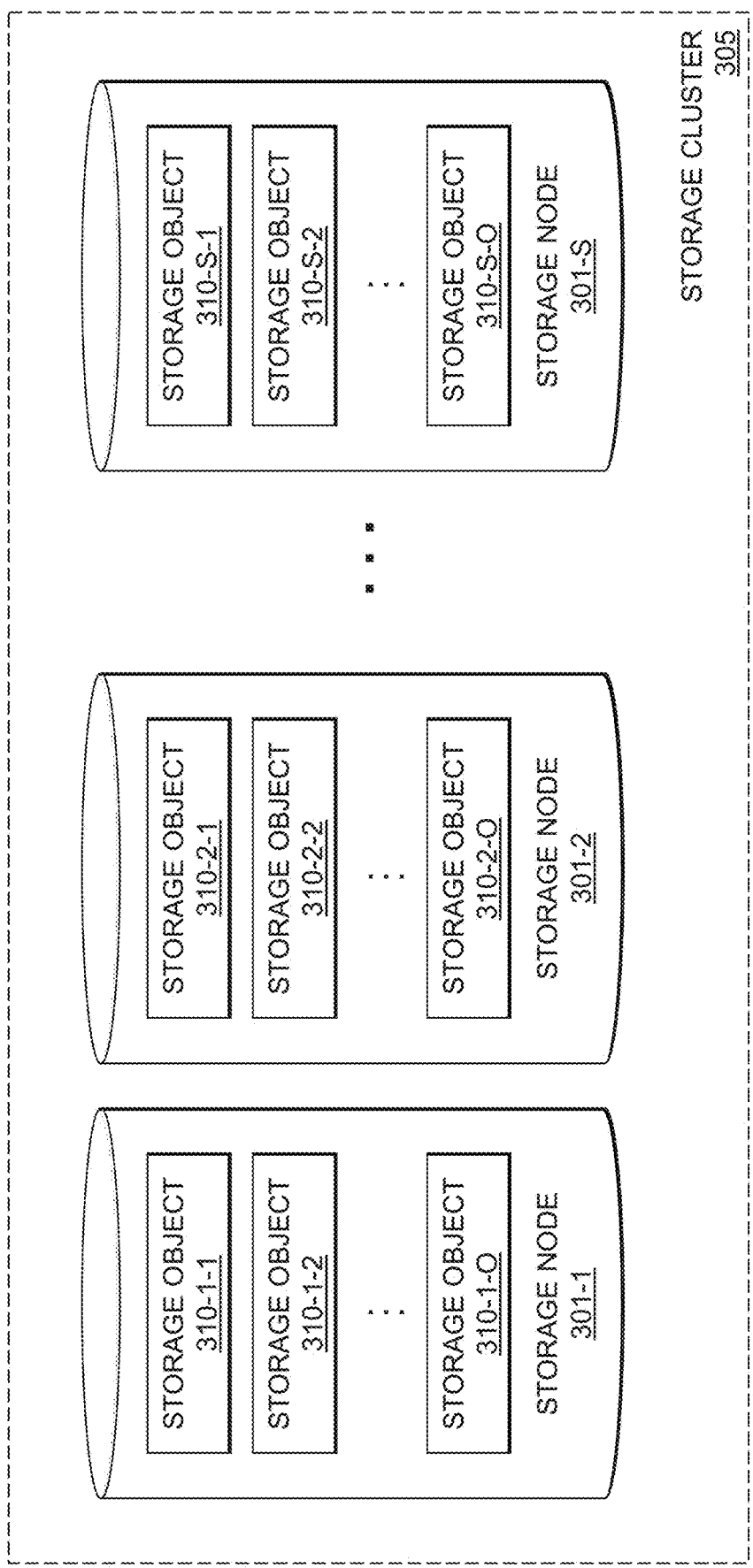
FIG. 3 shows storage objects stored on storage nodes of a storage cluster in an illustrative embodiment.

FIG. 3 illustrates a storage cluster 305 which includes multiple storage nodes 301-1, 301-2, . . . 301-S (collectively, storage nodes 301). Each of the storage nodes 301 stores a respective set of storage objects: the storage node 301-1 stores storage objects 310-1-1, 310-1-2, . . . 310-1-O (collectively, storage objects 310-1), the storage node 301-2 stores storage objects 310-2-1, 310-2-2, . . . 310-2-O (collectively, storage objects 310-2), and the storage node 301-S stores storage objects 310-S-1, 310-S-2, . . . 310-S-O (collectively, storage objects 310-S). The storage objects 310-1, 310-2, . . . 310-S are collectively referred to as storage objects 310. It should be appreciated that the particular number "O" of storage objects on each of the storage nodes 301 may differ. For example, the value of "O" for storage node 301-1 may be different than the value of "O" for storage node 301-2.

Conventional storage cluster load balancing mechanisms typically focus on balancing storage object load based on or at a single time point. Thus, such conventional storage cluster load balancing mechanisms may only achieve relatively short-term performance balancing. As storage object loads change over time, the load balancing achieved by conventional storage cluster load balancing mechanisms may be broken relatively soon after a load balancing operation is performed. Thus, load balancing operations need to be performed again and again in order to keep storage object load balanced between the storage nodes of the storage cluster. Further, frequent storage object migration operations themselves increase load on the storage nodes of the storage cluster which is not efficient.

Figure 4:
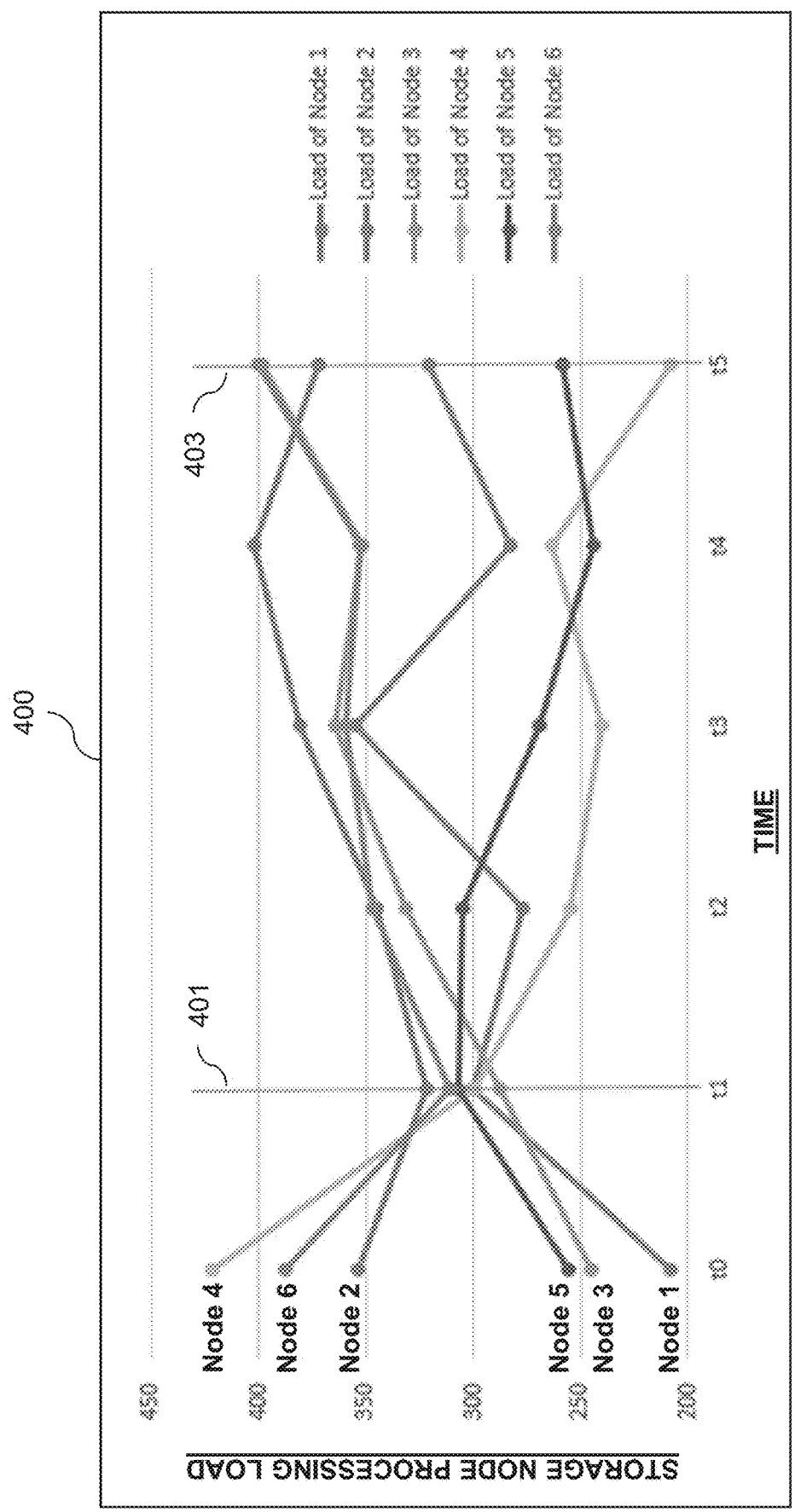
FIG. 4 shows a plot of storage node processing loads before and after a storage object re-balancing operation in an illustrative embodiment.

FIG. 4 shows a plot 400 of storage node processing load versus time. In the FIG. 4 example, there are six storage nodes in the storage cluster. A conventional load balancing operation is performed at a first point in time 401 (e.g., time t1), where the conventional load balancing operation takes into account only current storage node performance at one time point (e.g., time t1). Thus, as can be seen from the plot 400, the load balancing operation's balancing effect is temporary and the storage node processing load is unbalanced again at a second point in time 402 (e.g., before a time t5). The storage node performance distribution, in some cases, may worsen quickly following the load balancing operation performed at time t1. Thus, additional load balancing operations are needed frequently using such conventional approaches.

In illustrative embodiments, a storage cluster performance balancing mechanism is used which learns each storage node's and storage object's performance trend from historical data, and which leverages such performance trends to perform storage cluster-wide balancing through predicting storage node and storage object performance during a future time period (e.g., 10 days). Thus, each load balancing operation is expected to keep the storage cluster's performance distribution balanced for a relatively long time period, such as over at least the future time period (e.g., 10 days) in which storage node and storage object performance was predicted. In this way, embodiments can efficiently improve storage cluster performance balancing by keeping storage object distribution as balanced as possible with relatively fewer re-balancing operations (e.g., and thus, relatively fewer storage object movement operations).

In storage systems, most data (e.g., storage objects) exhibit access frequency patterns that vary over time. The access frequency patterns may vary according to how end-users or customers utilize the storage systems (e.g., specific customer business access frequency patterns). Non-stationary time series data is a focus since this is where valuable forecasting can take place. There are several patterns for non-stationary time series, including but not limited to increasing or decreasing trend patterns, cyclic trend patterns, and irregular trend patterns.

Figure 5:
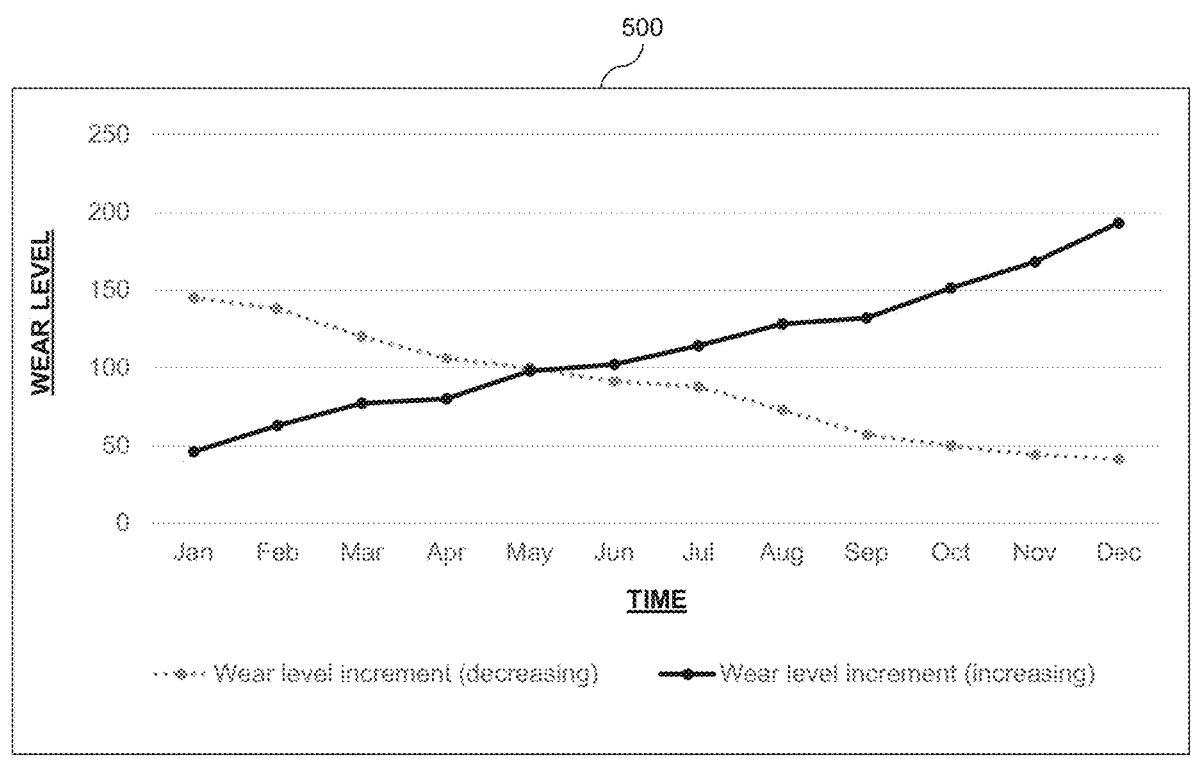
FIG. 5 shows a plot of increasing and decreasing storage access data pattern trends in an illustrative embodiment.

Increasing or decreasing trend patterns refer to long-term increase or decrease in access frequency. FIG. 5 shows a plot 500 illustrating decreasing and increasing wear level access patterns. Increasing and decreasing trend patterns may be linear or non-linear (e.g., exponential). In some embodiments, increasing and decreasing trend patterns are determined by leveraging least squares methods or other regression analysis. The method of least squares is an approach used in regression analysis, with important applications in data fitting. Least squares problems generally fall into one of two categories: linear or ordinary least squares; and nonlinear least squares.

Figure 6:
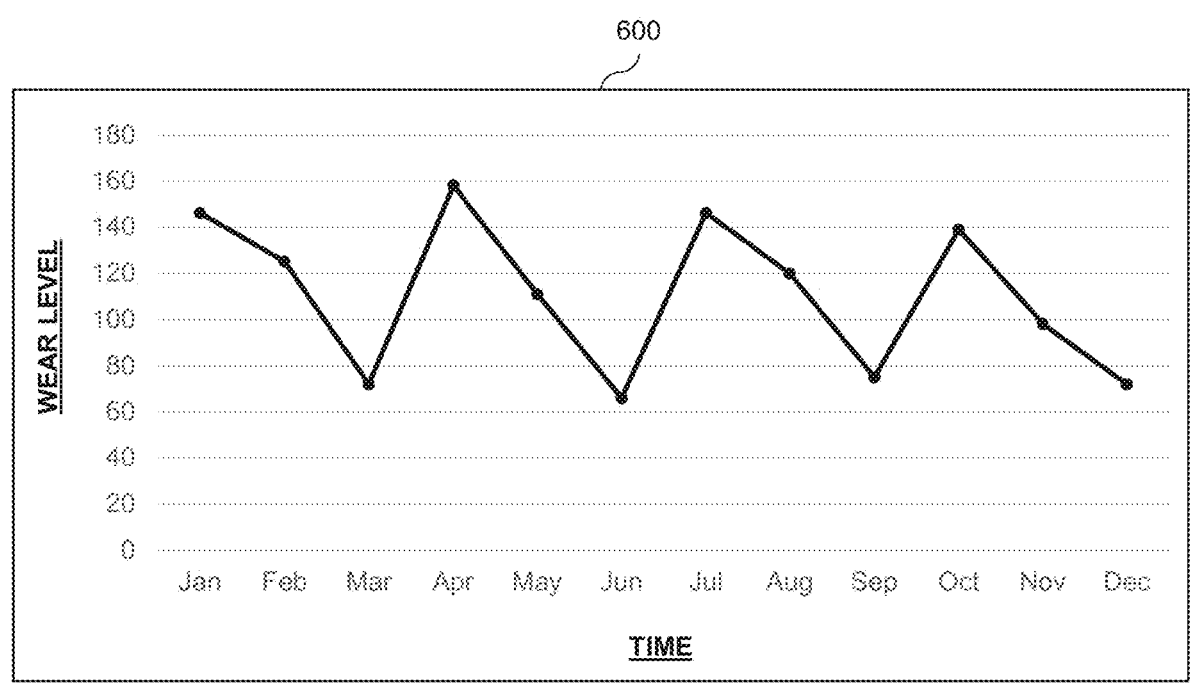
FIG. 6 shows a plot of a cyclic storage access data pattern trend in an illustrative embodiment.

Cyclic trend patterns refer to access frequency which rises and falls with a certain regularity. One common example is seasonality data, whose time series is affected by seasonal factors and data is in a fixed or known regularity (e.g., daily, weekly, monthly, yearly, etc.). FIG. 6 shows a plot 600 illustrating a cyclic wear level access pattern. To determine whether data access frequency is cyclic, autocorrelation and discrete Fourier transform methods may be leveraged to detect the periodicity and to further determine the period or frequency of a cyclic or seasonal time series. In the plot 600 of FIG. 6, for example, the wear level exhibits a quarterly cyclic trend pattern.

Figure 7:
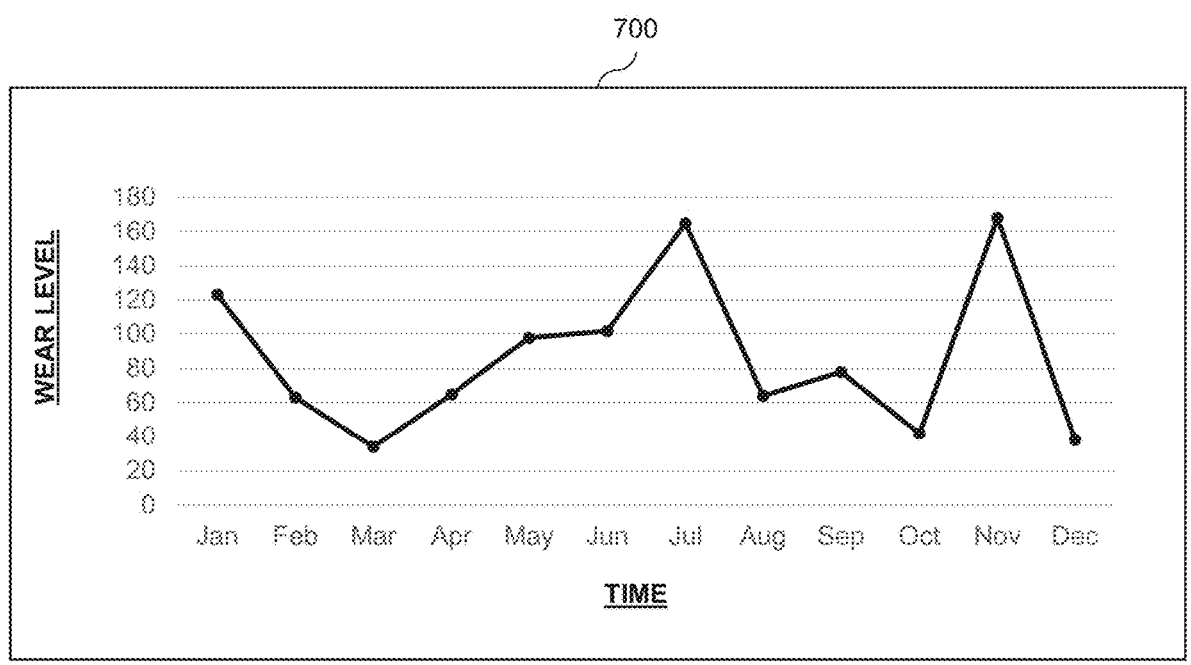
FIG. 7 shows a plot of an irregular storage access data pattern trend in an illustrative embodiment.

Irregular trend patterns refer to access frequency which changes randomly or is otherwise not predictable over some designated time frame. FIG. 7 shows a plot 700 illustrating an irregular wear level access pattern. In some embodiments, if data does not follow an increasing trend pattern, a decreasing trend pattern or a cyclic trend pattern, the data is classified as having an irregular trend pattern.

It should be appreciated that in other embodiments various other access frequency trend patterns may be used, and that various other methods may be used for identifying whether data access exhibits different access frequency trend patterns.

When triggering a smart rebalancing operation, storage object performance first needs to be predicted in a future time period. The future time period, in some embodiments, begins at the same time or close to the time at which the smart rebalancing operation is triggered. Trend functions for storage node and storage object performance over time may be determined using various data pattern detection and statistical analysis/data fitting models (e.g., least squares methods, autocorrelation, discrete Fourier transform methods, etc.). The performance of a storage node i at time point t, and the performance of a storage object j at time point t can be calculated by trend functions as follows:

$$PredP_{Node\ i,t} = TrendFunc(Node\ i, t)$$

$$PredP_{Object\ j,t} = TrendFunc(Object\ j, t)$$

In the equations above, TrendFunc denotes a trend function determined using data pattern detection and statistical analysis/data fitting models such as least squares methods, autocorrelation, discrete Fourier transform methods, etc.

Suppose there are K periodic sampling time points for a current re-balancing operation—$t_1$, $t_2$, $t_3$, ... $t_K$. The particular number K may selected by an end-user which determines a suitable and reasonable sampling period according to real-world usage scenarios. The sum of predicted performance of storage node i across the K periodic sampling points is calculated according to the following equation:

$$SumPredP_{Node\ i} = \sum_{k=1}^{K} PredP_{Node\ i,t_k} = \sum_{k=1}^{K} TrendFunc(Node\ i, t_k)$$

The sum of predicted performance of storage object j across the K periodic sampling points is calculated according to the following equation:

$$SumPredP_{Object\ j} = \sum_{k=1}^{K} PredP_{Object\ j,t_k} = \sum_{k=1}^{K} TrendFunc(Object\ j, t_k)$$

A set of rules is then used to rank storage nodes and storage objects, so as to determine which of them have the most potential of poor performance (e.g., high workload) in a future time period. The first step is to periodically sample each target (e.g., a storage node or storage object) by predicting its performance at certain time points in the future time period. The next step is to calculate, for each target (e.g., a storage node or storage object), its sum of predicted performance in the different sampling time points. The targets (e.g., storage nodes or storage objects) are then ranked by their respective sum of predicted performance values.

Based on the newly-introduced method for predicting storage node and storage object performance, a novel cluster storage object distribution rebalancing algorithm is implemented. First, a current performance imbalance rate, denoted μ, of a storage cluster is periodically evaluated according to the following equation:

$$\mu = \frac{\sqrt{\frac{\sum_{i=1}^{N}(P_{Node\ i} - P_{Node\ average})^2}{N-1}}}{P_{Node\ average}}$$

In the equation above, $P_{Node\ i}$ denotes the performance of storage node i, and N denotes the number of storage arrays or storage nodes in the storage cluster. The bigger the value of $P_{Node\ i}$, the higher the workload of the storage node i and the poorer the performance of the storage node i is.

Figure 8:
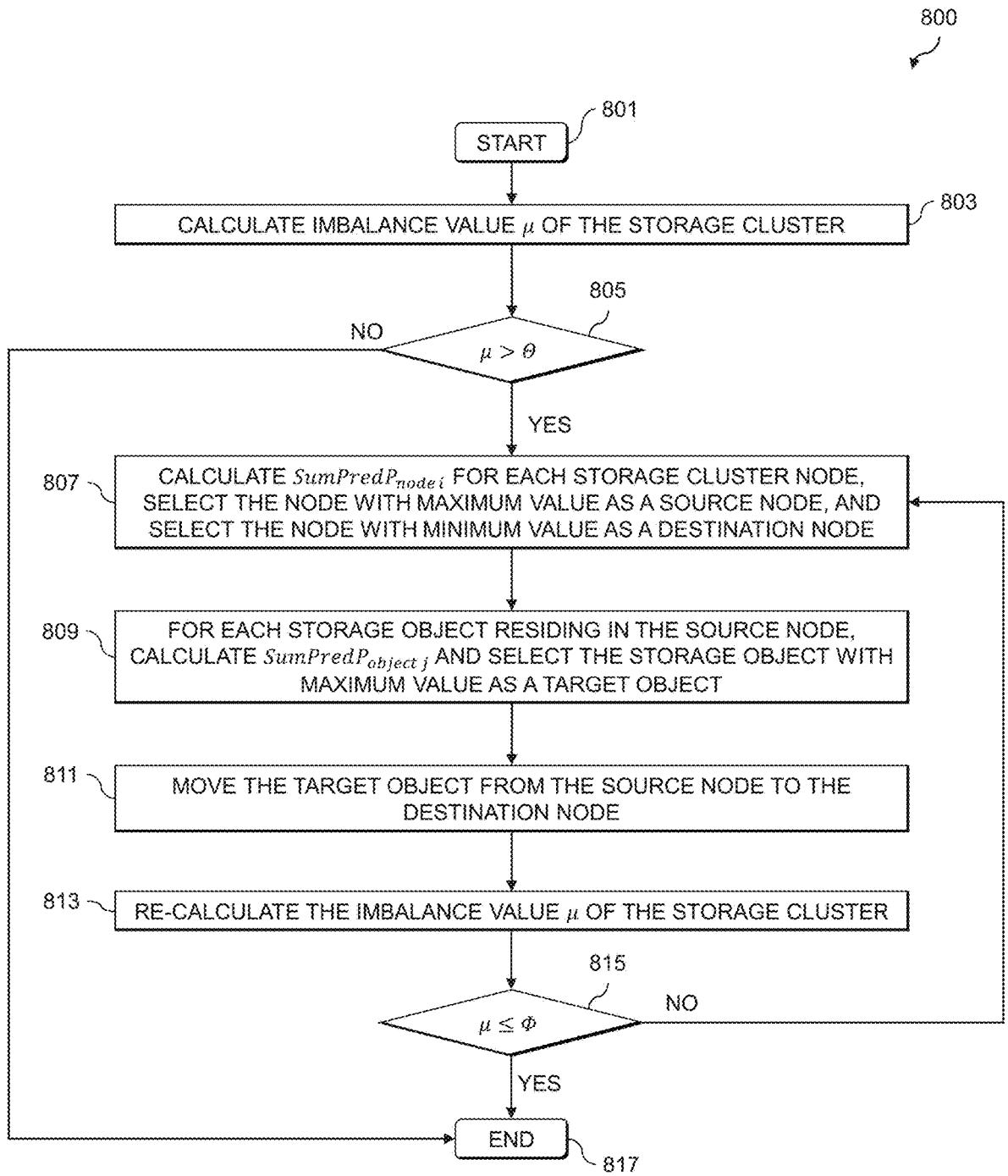
FIG. 8 shows a process flow for optimizing storage cluster performance through data movement across storage nodes in the storage cluster in an illustrative embodiment.

When the current imbalance rate μ exceeds an acceptable threshold value Θ, a storage object relocation algorithm is triggered. FIG. 8 illustrates a process flow 800 for the storage object relocation algorithm, which starts in step 801. In step 803, the imbalance value μ of the storage cluster is calculated. In step 805, a determination is made as to whether the current imbalance rate μ exceeds the acceptable threshold value Θ. If the result of the step 805 determination is no, the process flow 800 ends in step 817. If the result of the step 805 determination is yes, the process flow 800 proceeds to step 807. In step 807, SumPredP$_{Node\ i}$ is calculated for each storage node i in the storage cluster, with the storage node with maximum SumPredP$_{Node\ i}$ being selected as a source storage node, and the storage node with minimum SumPredP$_{Node\ i}$ being selected as a destination storage node. It should be appreciated that in some embodiments, step 807 may include calculating SumPredP$_{Node\ i}$ for only a subset of the storage nodes in the storage cluster rather than all storage nodes of the storage cluster. The particular number of the storage nodes in the subset may be user-configurable or based on some other factor. As an example, SumPredP$_{Node\ i}$ values may be calculated for different storage nodes in the storage cluster until it is determined that there is at least a threshold difference between a highest calculated SumPredP$_{Node\ i}$ value and a lowest calculated SumPredP$_{Node\ i}$ value, such that there would be at least a threshold benefit in moving storage objects between the storage node with the highest calculated SumPredP$_{Node\ i}$ value and the storage node with the lowest calculated SumPredP$_{Node\ i}$ value.

In step 809, SumPredP$_{Object\ j}$ is calculated for each storage object j residing in the source storage node, and the storage object with maximum SumPredP$_{Object}$ is selected as a target storage object. It should be appreciated that in some embodiments, step 809 may include calculating SumPredP$_{Object}$ for only a subset of the storage objects residing in the source storage node, rather than for all storage objects residing on the source storage node. The particular number of the storage objects in the subset may be user-configurable or based on some other factor. As an example, SumPredP$_{Object}$ values may be calculated for different storage objects residing in the source storage node until it is determined that there is at least a threshold difference between a highest calculated SumPredP$_{Object}$ value and a lowest calculated SumPredP$_{Object}$ value, such that there would be at least a threshold benefit in moving the storage object with the highest calculated SumPredP$_{Object}$ value over the storage object with the lowest calculated SumPredP$_{Object}$ value.

The target storage object is moved from the source storage node to the destination storage node in step 811. In step 813, the current imbalance rate μ is re-calculated after relocation of the target storage object. A determination is made in step 815 as to whether μ≤Φ. Here, Φ is the expected performance imbalance rate of the storage cluster that an end-user intends to achieve. The value of Φ is selected to avoid excessive storage object migration operations, which can cause resource contention. If the result of the step 815 determination is yes, the process flow 800 ends in step 817. If the result of the step 815 determination is no, the process flow returns to step 807.

In the process flow 800, storage node and storage object performance are predicted by sampling in a designated future time period, and the most "valued" storage object (e.g., with the maximum value of SumPredP$_{Object}$) residing in a higher-loaded storage node in the storage cluster (e.g., the source storage node) is moved from the higher-loaded storage node in the storage cluster to an optimal lower-loaded storage node in the storage cluster (e.g., the target storage node).

In some embodiments, additional characteristics or factors are taken into account when selecting the source and target storage nodes, as well as the most "valued" storage object to be moved from the source storage node to the target storage node in the storage cluster. Such characteristics and factors may include the type of access frequency trend pattern which is predicted for a given storage object. As an example, in some embodiments storage objects that are predicted to have an irregular access frequency trend pattern in the future time period may be considered poor candidates to be moved as part of cluster-wide load balancing (e.g., as such storage objects' associated access frequency is difficult to predict over the future time period).

Such characteristics and factors may also or alternatively include confidence in the predicted performance of the source storage node, the target storage node and the storage objects. For example, if the predicted access frequency trend pattern for a given storage object is below some designated confidence threshold, this may indicate that the given storage object is a poor candidate to be moved as part of cluster-wide load balancing (e.g., as the predicted access frequency trend pattern may be incorrect due to the low confidence in the prediction).

Additional characteristics and factors may include user-specified rules for: certain storage objects which should not be moved between storage nodes; whether different storage objects should or should not be co-located on the same storage node in the storage cluster; etc. Various other characteristics and factors may be taken into account when selecting the source storage node, the target storage node, and the storage object(s) to be moved from the source storage node to the target storage node.

Figure 9:
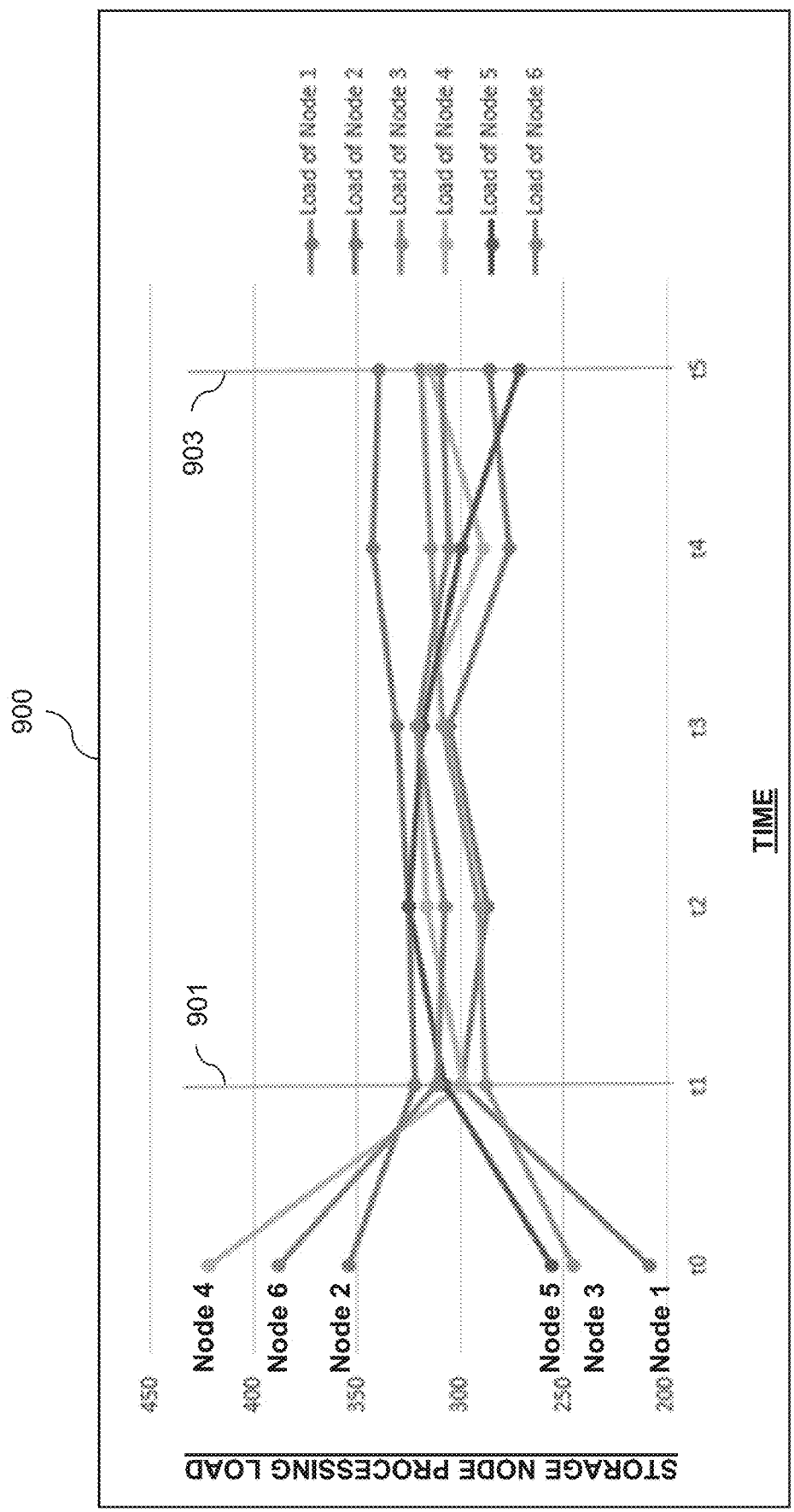
FIG. 9 shows a plot of storage node processing loads before and after smart storage object re-balancing operations in an illustrative embodiment.

FIG. 9 shows a plot 900 of storage node processing load versus time, similar to the plot 400 of FIG. 4 but where the process flow 800 is used for storage cluster-wide load balancing rather than a conventional load balancing approach. In the FIG. 9 example, there are six storage nodes in the storage cluster. The process flow 800 is performed at a first point in time 901 (e.g., a time t1), which takes into account predictions of storage node and storage object performance over multiple time points (e.g., times t1 through t5). Thus, as can be seen from the plot 900, the balancing effect is more long-term (e.g., as compared with the conventional load balancing performed in the FIG. 4 example) and the storage node processing load remains balanced for a longer period of time through at least time 903 (e.g., through at least time t5) corresponding to at least the length of time where the storage node and storage object performance is predicted. Thus, the frequency of load balancing operations can advantageously be reduced. Re-balancing is based on comprehensive storage object and storage node performance analysis, enabling the storage cluster to achieve well-balanced performance with no need to perform re-balancing again at time t5. This not only improves the efficiency of re-balancing, but also reduces consumption of resources in the storage cluster (e.g., processing, memory, storage and network resources of the storage nodes in the storage cluster) and reduces service reliability issues caused by frequent storage object movement.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for storage cluster load balancing based on predicted performance metrics will now be described in greater detail with reference to FIGS. 10 and 11. Although described in the context of system 100, these platforms may also be used to implement at least portions of other information processing systems in other embodiments.

Figure 10:
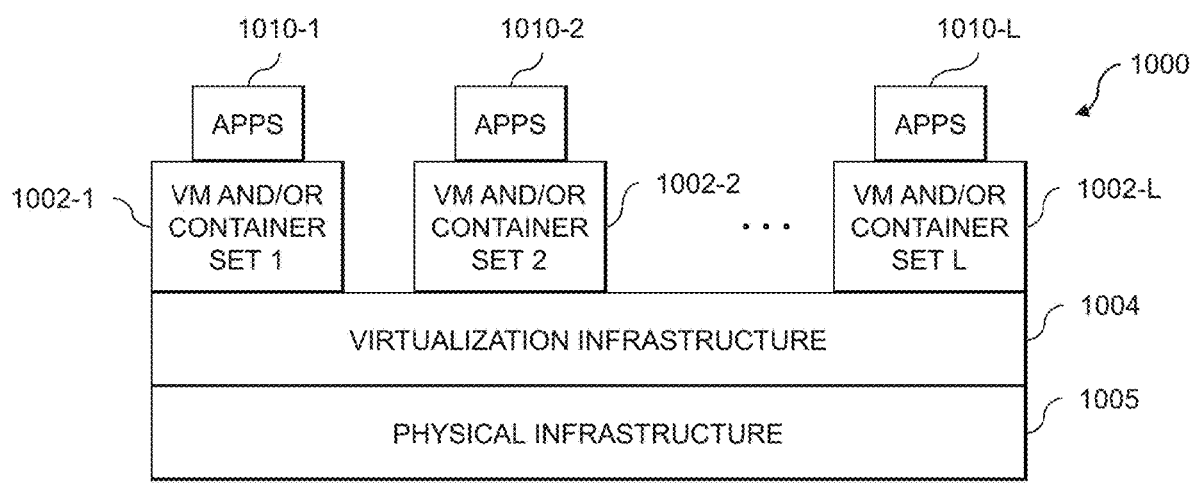
FIGS. 10 and 11 show examples of processing platforms that may be utilized to implement at least a portion of an information processing system in illustrative embodiments.
Figure 11:
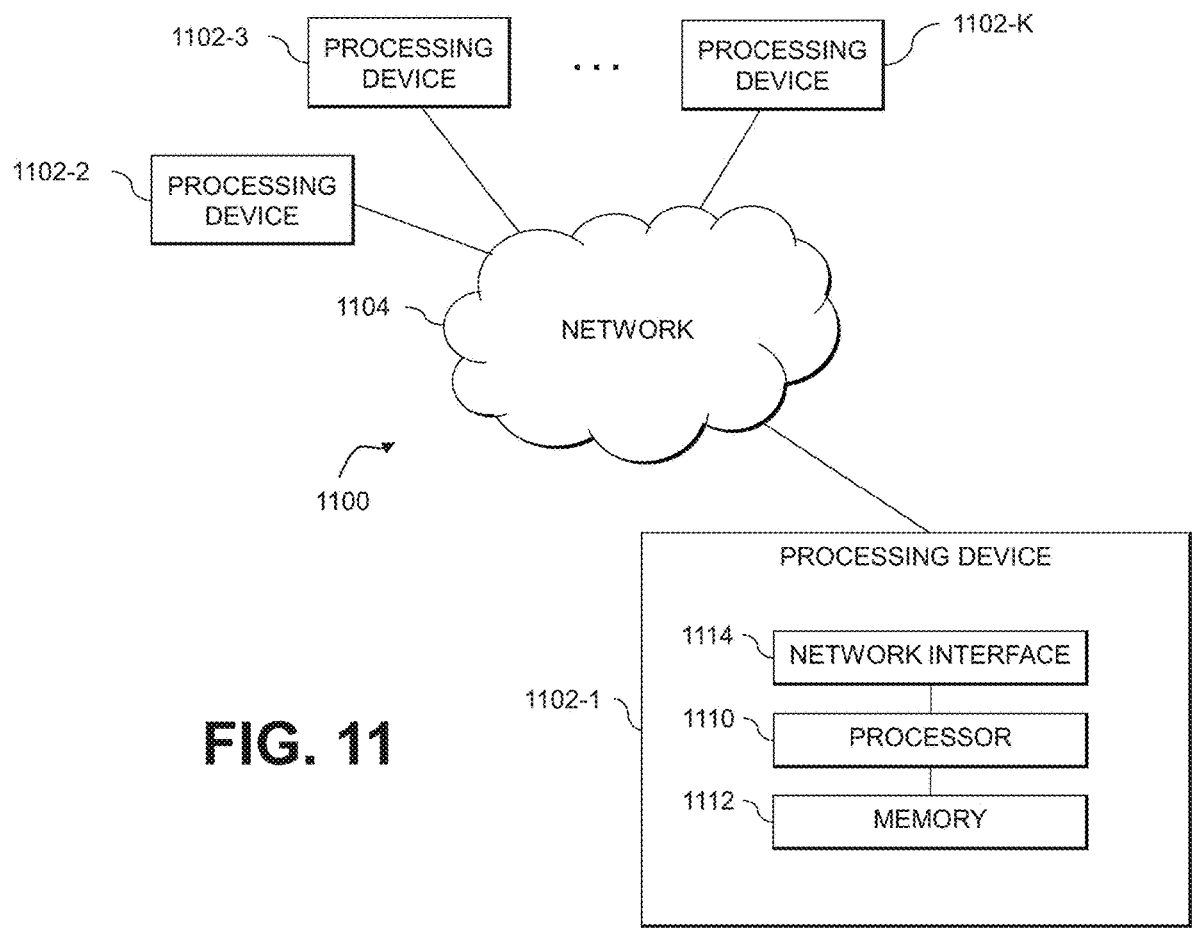

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for storage cluster load balancing based on predicted performance metrics as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage clusters, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
initiating load balancing for a storage cluster comprising two or more storage nodes;
predicting performance metrics for the two or more storage nodes of the storage cluster at two or more time points in a designated future period of time;
selecting, based at least in part on the predicted performance metrics for the two or more storage nodes of the storage cluster at the two or more time points in the designated future period of time, a first one of the two or more storage nodes of the storage cluster as a source storage node and a second one of the two or more storage nodes of the storage cluster as a target storage node;
determining at least one storage object residing on the source storage node which, when migrated to the target storage node, reduces a performance imbalance rate of the storage cluster for at least the designated future period of time; and
performing load balancing for the storage cluster by migrating said at least one storage object from the source storage node to the target storage node.

2. The apparatus of claim 1 wherein initiating load balancing for the storage cluster is responsive to detecting that a current performance imbalance rate of the storage cluster exceeds a first designated threshold imbalance rate.

3. The apparatus of claim 2 wherein the predicting, selecting, determining and performing steps are repeated until the current performance imbalance rate of the storage cluster is below a second designated threshold imbalance rate.

4. The apparatus of claim 3 wherein the second designated threshold imbalance rate is less than the first designated threshold imbalance rate.

5. The apparatus of claim 1 wherein predicting the performance metrics for a given one of the two or more storage nodes of the storage cluster at the two or more time points in the designated future period of time comprises:
determining an access frequency trend pattern for the given storage node; and
utilizing the access frequency trend pattern to calculate a predicted performance metric for the given storage node at each of the two or more time points in the designated future period of time.

6. The apparatus of claim 5 wherein determining the access frequency trend pattern for the given storage node comprises generating a trend function for predicting a total amount of data accesses for the given storage node at the two or more time points in the designated future period of time.

7. The apparatus of claim 6 wherein the access frequency trend pattern for the given storage node comprises one of an increasing access frequency trend pattern and a decreasing access frequency trend pattern, and wherein the prediction function is generated utilizing a least squares algorithm.

8. The apparatus of claim 6 wherein the access frequency trend pattern comprises a cyclic access frequency trend pattern, and wherein the prediction function is generated utilizing at least one of an autocorrelation algorithm and a discrete Fourier transform algorithm.

9. The apparatus of claim 6 wherein the access frequency trend pattern comprises an irregular access frequency pattern, and wherein the prediction function is generated utilizing an average of historical data accesses for the given storage node over a previous period of time.

10. The apparatus of claim 1 wherein the first one of the two or more storage nodes of the storage cluster selected as the source storage node has a higher sum of predicted performance metrics for the two or more time points in the designated future period of time than the second one of the two or more storage nodes of the storage cluster selected as the target storage node.

11. The apparatus of claim 1 wherein determining said at least one storage object residing on the source storage node which, when migrated to the target storage node, reduces the performance imbalance rate of the storage cluster for at least the designated future period of time is based at least in part on predicting performance metrics for two or more storage objects residing on the source storage node at the two or more time points in the designated future period of time.

12. The apparatus of claim 11 wherein predicting the performance metrics for the two or more storage objects residing on the source storage node at the two or more time points in the designated future period of time comprises:
determining access frequency trend patterns for the two or more storage objects residing on the source storage node;
utilizing the determined access frequency trend patterns to calculate predicted performance metrics for the two or more storage objects residing on the source storage node at each of the two or more time points in the designated future period of time; and
selecting a given one of the two or more storage objects residing on the source storage node as said at least one storage object based at least in part on a comparison of sums of the predicted performance metrics for the two or more time points in the designated future period of time for the two or more storage objects residing on the source storage node.

13. The apparatus of claim 12 wherein selecting the given one of the two or more storage objects residing on the source storage node as said at least one storage object is further based at least in part on types of access frequency trend patterns associated with the two or more storage objects residing on the source storage node.

14. The apparatus of claim 12 wherein selecting the given one of the two or more storage objects residing on the source storage node as said at least one storage object is further based at least in part on a confidence in the predicted performance metrics for the two or more storage objects residing on the source storage node.

15. A computer program product comprising a non-transitory processor-readable storage medium having stored therein program code of one or more software programs, wherein the program code when executed by at least one processing device causes the at least one processing device to perform steps of:
initiating load balancing for a storage cluster comprising two or more storage nodes;
predicting performance metrics for the two or more storage nodes of the storage cluster at two or more time points in a designated future period of time;
selecting, based at least in part on the predicted performance metrics for the two or more storage nodes of the storage cluster at the two or more time points in the designated future period of time, a first one of the two or more storage nodes of the storage cluster as a source storage node and a second one of the two or more storage nodes of the storage cluster as a target storage node;

determining at least one storage object residing on the source storage node which, when migrated to the target storage node, reduces a performance imbalance rate of the storage cluster for at least the designated future period of time; and performing load balancing for the storage cluster by migrating said at least one storage object from the source storage node to the target storage node.

16. The computer program product of claim 15 wherein the first one of the two or more storage nodes of the storage cluster selected as the source storage node has a higher sum of predicted performance metrics for the two or more time points in the designated future period of time than the second one of the two or more storage nodes of the storage cluster selected as the target storage node.

17. The computer program product of claim 15 wherein determining said at least one storage object residing on the source storage node which, when migrated to the target storage node, reduces the performance imbalance rate of the storage cluster for at least the designated future period of time is based at least in part on predicting performance metrics for two or more storage objects residing on the source storage node at the two or more time points in the designated future period of time.

18. A method comprising:

initiating load balancing for a storage cluster comprising two or more storage nodes;

predicting performance metrics for the two or more storage nodes of the storage cluster at two or more time points in a designated future period of time;

selecting, based at least in part on the predicted performance metrics for the two or more storage nodes of the storage cluster at the two or more time points in the designated future period of time, a first one of the two or more storage nodes of the storage cluster as a source storage node and a second one of the two or more storage nodes of the storage cluster as a target storage node;

determining at least one storage object residing on the source storage node which, when migrated to the target storage node, reduces a performance imbalance rate of the storage cluster for at least the designated future period of time; and performing load balancing for the storage cluster by migrating said at least one storage object from the source storage node to the target storage node;

wherein the method is performed by at least one processing device comprising a processor coupled to a memory.

19. The method of claim 18 wherein the first one of the two or more storage nodes of the storage cluster selected as the source storage node has a higher sum of predicted performance metrics for the two or more time points in the designated future period of time than the second one of the two or more storage nodes of the storage cluster selected as the target storage node.

20. The method of claim 18 wherein determining said at least one storage object residing on the source storage node which, when migrated to the target storage node, reduces the performance imbalance rate of the storage cluster for at least the designated future period of time is based at least in part on predicting performance metrics for two or more storage objects residing on the source storage node at the two or more time points in the designated future period of time.

* * * * *